United States Patent
Hessel et al.

(10) Patent No.: US 7,761,904 B2
(45) Date of Patent: Jul. 20, 2010

(54) REMOVABLE CRYPTOGRAPHIC IGNITION KEY SYSTEM AND METHOD

(75) Inventors: Clifford Hessel, Rochester, NY (US); David Mark Smith, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 968 days.

(21) Appl. No.: 10/259,866

(22) Filed: Sep. 30, 2002

(65) Prior Publication Data

US 2004/0064720 A1 Apr. 1, 2004

(51) Int. Cl.
 G06F 7/04 (2006.01)
 G06F 17/30 (2006.01)
(52) U.S. Cl. .................. 726/2; 726/9; 713/182; 713/184
(58) Field of Classification Search .......... 235/375; 713/184; 726/19–20, 9, 2
 See application file for complete search history.

(56) References Cited

U.S. PATENT DOCUMENTS

| | | | | |
|---|---|---|---|---|
| 5,288,981 A | * | 2/1994 | Davis | 235/449 |
| 5,548,721 A | | 8/1996 | Denslow | |
| 5,742,756 A | * | 4/1998 | Dillaway et al. | 726/20 |
| 5,836,010 A | * | 11/1998 | Kim | 726/20 |
| 5,887,064 A | * | 3/1999 | Seysen | 713/172 |
| 5,892,901 A | * | 4/1999 | Landwehr et al. | 726/34 |
| 6,189,105 B1 | * | 2/2001 | Lopes | 726/20 |
| 6,260,111 B1 | * | 7/2001 | Craig et al. | 711/115 |
| 6,556,819 B2 | * | 4/2003 | Irvin | 455/410 |
| 6,761,310 B2 | * | 7/2004 | May | 235/380 |

FOREIGN PATENT DOCUMENTS

WO  WO 9739553 A1 * 10/1997

* cited by examiner

*Primary Examiner*—Kimyen Vu
*Assistant Examiner*—Yogesh Paliwal
(74) *Attorney, Agent, or Firm*—Duane Morris, LLP (57) ABSTRACT

A removable, wireless, cryptographic ignition key (CIK) provides a user the capability to conduct secure operations utilizing a processor as long as the CIK is within the vicinity of the processor. This removable CIK may be utilized in applications related to conducting secure operations on desktop computers, laptop computers, wireless telephones, handheld radios (e.g., military radios requiring secure communications), and personal digital assistants (PDAs). Secure operations are enabled upon insertion and removal of the CIK into/from the processor. If a predetermined proximity between the removable CIK and the processor is exceeded (e.g., the user leaves the room, the user puts the processor on a moving belt on an X-ray machine at the airport, the processor is stolen), secure operations are disabled. Secure operations may be resumed, upon the CIK being inserted and removed into/from the processor again.

3 Claims, 5 Drawing Sheets

REMOVABLE CRYPTOGRAPHIC IGNITION KEY SYSTEM AND METHOD

BACKGROUND OF THE INVENTION

The present invention is generally related to cryptographic ignition keys (CIKs), and more specifically related to removable cryptographic ignition keys.

Information contained on processors, such as laptop computers and programmable digital assistants (PDAs), is often as valuable, if not more valuable, to a user/owner of the processor than the processor itself. Thus, it is often desirable to deny access to information contained on the processor to unauthorized users. One way to accomplish this is through the use of a cryptographic ignition key (CIK). A CIK facilitates the prevention of unauthorized access to a processor thus protecting internally stored information. When the CIK is inserted into the processor, secure operations are allowed. When the CIK is removed from the processor, secure operations are disallowed.

However, a problem particularly associated with portable processors (e.g., laptop computers, PDAs, and military handheld radios used to conduct secure communications), is that it is possible to misplace the processor, or the processor may be stolen, with the CIK in the processor. This is more likely to happen in situations where the user of the processor expects to be separated from the processor for only a short period of time, and thus does not feel a need to extract the CIK. Examples of such situations include, a user leaving the room where the processor is located to take a short break (e.g., get a drink, smoke a cigarette, go to the bathroom), a user leaving a laptop computer on a chair at the airport, a user placing a laptop on the conveyer belt of an X-ray machine at an airport security checkpoint, or a soldier leaving a military handheld radio in the field. An unauthorized user, stumbling upon, or intentionally taking, a processor having the CIK installed, may wreak havoc with the secure information on the processor. An improved system and method for utilizing a CIK is desired.

In one embodiment, a system for conducting secure operations utilizing a removable cryptographic ignition key (CIK), includes the removable CIK, a processor, and a proximity detector. The processor is configured to receive the removable CIK. Secure operations are enabled subsequent to receiving the removable CIK. The proximity detector is configured to determine a distance between the removable CIK and the processor. Secure operations are enabled while the removable CIK is within a predetermined distance of the processor, and secure operations are disabled when a distance between the removable CIK and the processor is greater than the predetermined distance.

In another embodiment, a method for conducting secure operations utilizing a removable cryptographic ignition key (CIK), a processor, and a proximity detector, includes receiving the removable CIK by the processor, wherein secure operations are enabled subsequent to receipt of the removable CIK by the processor. It is determined if a distance between the removable CIK and the processor has exceeded a predetermined distance. Secure operations are enabled while said removable CIK is within the predetermined distance of the processor and secure operations are disabled when a distance between the removable CIK and the processor is greater than the predetermined distance.

DETAILED DESCRIPTION

A removable, wireless, cryptographic ignition key (CIK), as described herein, provides a user the capability to conduct secure operations utilizing a processor as long as the CIK is within the vicinity of the processor, and not necessarily inserted into the processor. CIKs are known in the art, and typically have stored therein a password (or equivalent means) for unlocking the processor's secure operations capability. Thus, secure operations are enabled upon insertion of the CIK into the processor. Example processors include desktop computers, laptop computers, wireless telephones, handheld radios (e.g., military radios requiring secure communications), and personal digital assistants (PDAs). The CIK and the processor may be envisioned as coupled together by a tether (however, the coupling between the CIK and the processor is wireless), enabling secure operations while the CIK is within the vicinity of the processor. Once the CIK and the processor are not in the vicinity of each other, the tether is broken and secure operations are disabled. As described in more detail below, a signal conveyed between the removable CIK and the processor is analyzed to determine if a distance between the removable CIK and the processor are within a predetermined distance. As long as this signal is conveyed, secure operations are enabled. However, if this conveyed signal is interrupted and/or corrupted, secure operations are disabled. In one embodiment, the user has the ability to manually disable secure operations (e.g., by interrupting the conveyed signal or sending a specific signal) regardless of the distance between the CIK and the processor. This capability is particularly advantageous in situations where unauthorized access is being attempted by force.

Various embodiments of a system for conducting secure operations utilizing a removable CIK are envisioned. In one embodiment, the user inserts the CIK into the processor. Secure operations are enabled upon insertion of the CIK into the processor. In this embodiment, the CIK may remain inserted in the processor while secure operations are conducted, or the user, at her discretion, may remove the CIK from the processor while continuing to conduct secure operations. While the CIK and the processor are within a predetermined distance from each other, secure operations are, enabled. However, if the predetermined distance between the removable CIK and the processor is exceeded (e.g., the user leaves the room, the user puts the processor on a moving belt on an X-ray machine at the airport, the processor is stolen), secure operations are disabled. Secure operations may be resumed, upon the CIK being inserted into the processor again. In another embodiment, the user inserts the CIK into the processor and subsequently removes the CIK from the processor. Secure operations are enabled upon removal of the CIK from the processor. In this embodiment, the user may not conduct secure operations until the CIK is removed from the processor. However, as described above, while the CIK and the processor are within a predetermined distance of each other, secure operations are enabled. The user may keep the CIK on her person, such as in her pocket or on a chain around her neck, for example. In yet other embodiments, the user may manually disable secure operations or zeroize portions of the processor and/or the removable CIK from within the predetermined distance. Other embodiments, as described in more detail below, include various configurations of the system.

Figure 1:
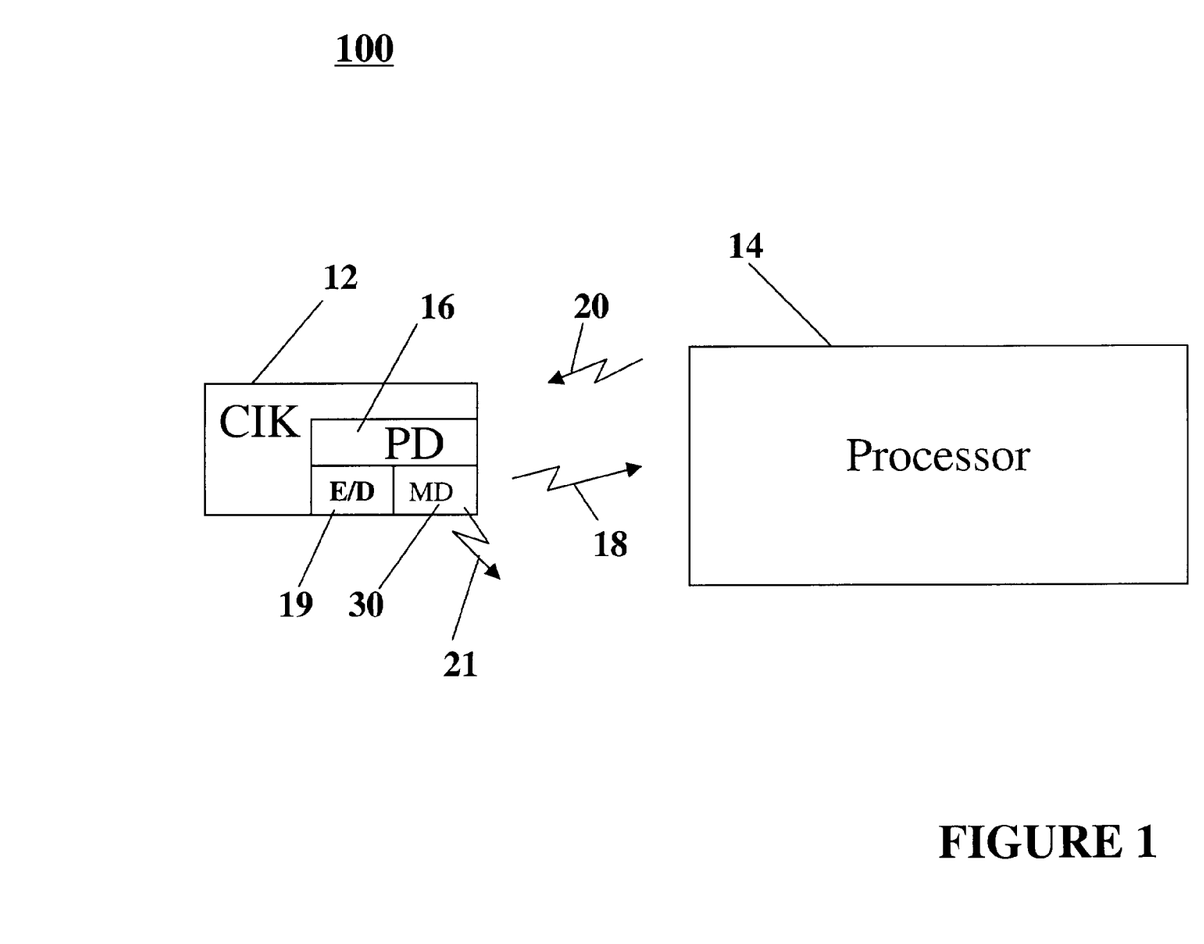
FIG. 1 is a functional block diagram of a system for conducting secure operations utilizing a removable cryptographic ignition key (CIK) in accordance with an embodiment of the present invention.

Referring now to FIG. 1, there is shown a functional block diagram of a system 100 for conducting secure operations utilizing a removable CIK 12. The system 100 comprises a processor 14, the CIK 12 and a proximity detector 16. In one embodiment, the CIK 12 is battery powered, capable of being removed from the processor 14, and wirelessly coupled to the processor 14. The CIK 12 allows conduction of secure operations (e.g., encrypt and decrypt communications) using the processor 14. Various forms of the CIK 12 are envisioned. For example, the CIK 12 may be in the form of a key card (e.g., smart card), a key, a token, or a disk. The processor 14 is configured to receive the CIK 12. Receiving the CIK 12 may include inserting the CIK 12 into a slot on the processor 14, swiping the CIK 12 through a card reading mechanism on the processor 14, placing the CIK 12 in contact with a magnetic reading mechanism on the processor 14, inserting the CIK 12 into a disk reader on the processor 14, or a combination thereof, for example.

The processor 14 may include any processor capable of conducting secure operations. Examples of appropriate processors 14 include handheld radios, laptop computers, desktop computers, general-purpose computers, and telephones. Secure operations may include operation such as encrypting and decrypting communications, encoding and decoding information, or a combination thereof, for example.

The proximity detector 16 determines if the distance between the CIK 12 and the processor 14 has exceeded a predetermined distance. For example, assuming that a predetermined distance is 5 feet, if the CIK 12 and the processor 14 become separated by more than 5 feet, secure operations are disabled. Various types of proximity detectors 16 are envisioned. For example, the proximity detector 16 may utilize acoustic energy (e.g., sonic or ultrasonic), electromagnetic energy (e.g., radio frequency, magnetic fields), optic energy (e.g., infrared), or a combination thereof to determine the distance between the CIK 12 and the processor 14. Various means may be utilized to determine if the distance between the CIK 12 and the processor 14 has exceeded a predetermined distance. Briefly, in one embodiment, the amplitude of a signal, such a signal transmitted and/or received by the proximity detector 16, may be analyzed. In this embodiment, if the amplitude of the signal (signal strength) becomes too weak (e.g., less than a threshold value), the system 100 (e.g., processor 14) determines that the predetermined distance has been exceeded and secure operations are disabled. In another embodiment, the time difference between a transmitted signal and a received signal is analyzed (e.g., compared with a threshold value) to determine if the distance between the CIK 12 and the processor 14 has exceeded a predetermined distance. In yet another embodiment, a signal contains information (e.g., counter values, random number sequence values), which is analyzed to determined if a predetermined distance has been exceeded. Also, the transmission power of the signal conveyed between the removable CIK 12 and the processor 14 is limited to establish the predetermined distance. In each of these embodiments, security is maintained by ensuring that signals conveyed between the processor 14 and the CIK 12 are not indicative of the CIK's embedded password. Security is also maintained by ensuring that (protecting) characteristics of the signal(s) conveyed between the removable CIK 12 and the processor 14 are not predictable by an unauthorized user. Protecting characteristics of the conveyed signal(s) from unauthorized predictability may be accomplished, for example, by the conveyed signals being indicative of randomly (or pseudo-randomly) generated numbers, encrypting the conveyed signals, the conveyed signals being indicative of a non-deterministic sequence of number, or a combination thereof.

Various configurations of the proximity detector are envisioned as shown in systems 100, 100A, 100B, and 100C, of FIGS. 1, 2, 3, and 4, respectively. As shown in system 100 of FIG. 1, the proximity detector 16 resides completely in the CIK 12. In this configuration, the proximity detector 16 transmits a proximity signal 18 for determining the distance between the processor 14 and the CIK 12. The proximity detector 16 receives the return signal 20, which is analyzed to determine the distance between the CIK 12 and the processor 14. The signal 20 may be an echo signal resulting from the proximity signal 18 being reflected by the processor 14 in the direction of the CIK 12 and the proximity detector 16. The processor 14 may comprise a repeater (not shown) that receives the proximity signal 18 and transmitted the signal 20 in response to receipt of the proximity signal 18. The signal strength of the return signal 20 may by compared to a threshold value of signal strength to determine if a predetermined distance has been exceeded; the return signal 20 may be analyzed by determining the time difference between the transmission of the proximity signal 18 and receipt of the return signal 20 by the proximity detector 16; or a combination thereof. When the determined time difference is greater than a predetermined value, the CIK 12 and the processor 14 are determined to be far enough away from each other (the predetermined distance is exceeded) and secure operations are disabled.

In another embodiment, a plurality of proximity signals 18 are transmitted resulting in a series of pulses. The series of pulses are reflected back to the proximity detector 16 via the return signal 20. The series of pulses received by the proximity detector 16 via the return signal 20 are detected and analyzed to determine if the CIK 12 and the processor 14 are within the predetermined distance with respect to each other. If, within a predetermined amount of time, no pulses are detected via the return signal 20, it is determined that the distance between the CIK 12 and the processor 14 is greater than the predetermined distance, and secure operations are disabled. Alternatively, each pulse of the plurality of pulses may be indicative of a respective counter value. For example, each pulse may represent an incremented value (e.g., one pulse representing the counter value 1, the next pulse representing the counter value 2, . . . ). If the difference in the counter values in consecutively received pulses exceeds a predetermined difference, it is determined that the distance between the CIK 12 and the processor 14 is greater than the predetermined distance, and secure operations are disabled.

In yet another embodiment, the series of pulses may be indicative of a series of randomly generated numbers. If an expected random number value is not received (e.g., via signal 20) for a predetermined number of pulses, the system 100 determines that the distance between the CIK 12 and the processor 14 has exceed the predetermined distance.

Security is maintained by preventing unauthorized monitoring of the proximity signal 18, the echo signal 20, or a combination thereof. One means of maintaining security is to ensure that the CIK's embedded password is not conveyed between the processor and the CIK 12 via the signal 18 and/or the signal 20. Also, the proximity signal 18 may be encrypted by encryption/decryption portion 19 of the proximity detector 16 prior to transmission and the return signal 20 may be appropriately decrypted by encryption/decryption portion 19 upon receipt. Encrypting the proximity signal 18 helps to prevent unauthorized reception and copying of the proximity signal 18. Thus, an unauthorized user may be prevented from monitoring the proximity signal 18 and/or the return signal 20, and copying same to trick the processor into "thinking" that the CIK is within the predetermined distance.

The system 100 may be configured to include manual disable portion 30. Manual disable portion 30 allows the user to disable secure operations at any time, regardless of the distance between the CIK 12 and the processor 14. The manual disable portion 30 allows the user to immediately disable secure operations. The manual disable portion 30 may comprise any appropriate means for allowing the user to disable secure operations, such as a hardware switch or voice activated switch (e.g., positioned on the CIK 12). The manual disable portion 30 may interrupt (e.g., stop transmitting) conveyance of the proximity signal 18, may corrupt (e.g., send an invalid sequence) the proximity signal 18, may transmit a signal, such as manual disable signal 21, indicating that secure operations are to be disabled, or a combination thereof. Secure operations may be disabled by any appropriate means, for example by disabling a display, disabling a transmitter, disabling a receiver, disabling power, or a combination thereof. In another embodiment, the manual disable portion 30 includes a means for zeroizing the processor 14, zeroizing the removable CIK 12, or a combination thereof. Zeroizing disables secure operations by equating selected parameters to a predetermined value (e.g., zero). Consequently, secure operations will not be recoverable unless the system is reinitialized. Thus, the manual disable portion 30 may comprise separate means (e.g., switches), one for disabling secure operations without zeroizing and the other for zeroizing the processor 14. Alternatively, the choice of disabling secure operations without zeroizing or zeroing is predetermined. When the user activates the switch, the predetermined function is performed.

The system 100 may optionally be configured to include a timer to be used to determine the amount of time the distance between the CIK 12 and the processor 14 has exceed the predetermined distance. In this configuration, if the distance between the CIK 12 and the processor 14 has exceeded the predetermined distance for less than or equal to a predetermined amount of time, the user may continue secure operations by either reinserting the CIK 12 into the processor 14 or ensuring that the CIK 12 and the processor 14 are within the predetermined distance from each other. If the distance between the CIK 12 and the processor 14 has exceeded the predetermined distance for greater than the predetermined amount of time, the user may not simply continue secure operations, but will have to reinitialize the system. That is, key parameters will be zeroized and will not be recoverable unless the system is reinitialized. This configuration is applicable to the situation in which a user starts to walk away from the processor 14, with the CIK 12 in her pocket, but very quickly realizes that she has the key in her pocket and returns to the processor 14. At the point, two options are envisioned. In a first option, if the predetermined amount of time has not been exceed, the user may simply ensure that the CIK 12 is within the predetermined distance from the processor 14 and continue secure operations. In a second option, the user will have to reinsert the CIK 12 into the processor 14 to continue secure operations. For example, assume that the predetermined distance between the CIK 12 and the processor 14 is 5 feet, and assume that the predetermined amount of time, which the distance between the CIK 12 and the processor 14 may exceed the predetermined distance of feet is 10 seconds. In this example, the user may walk away from the processor 14 with the CIK 12 in her pocket and be further than 5 feet away from the processor for almost 10 seconds. Then, under the first option, within 10 seconds, she can walk back to within 5 feet of the processor to continue secure operations. Under the second option, within 10 seconds, she will have to reinsert the CIK 12 into the processor 14 to continue secure processing.

Figure 2:
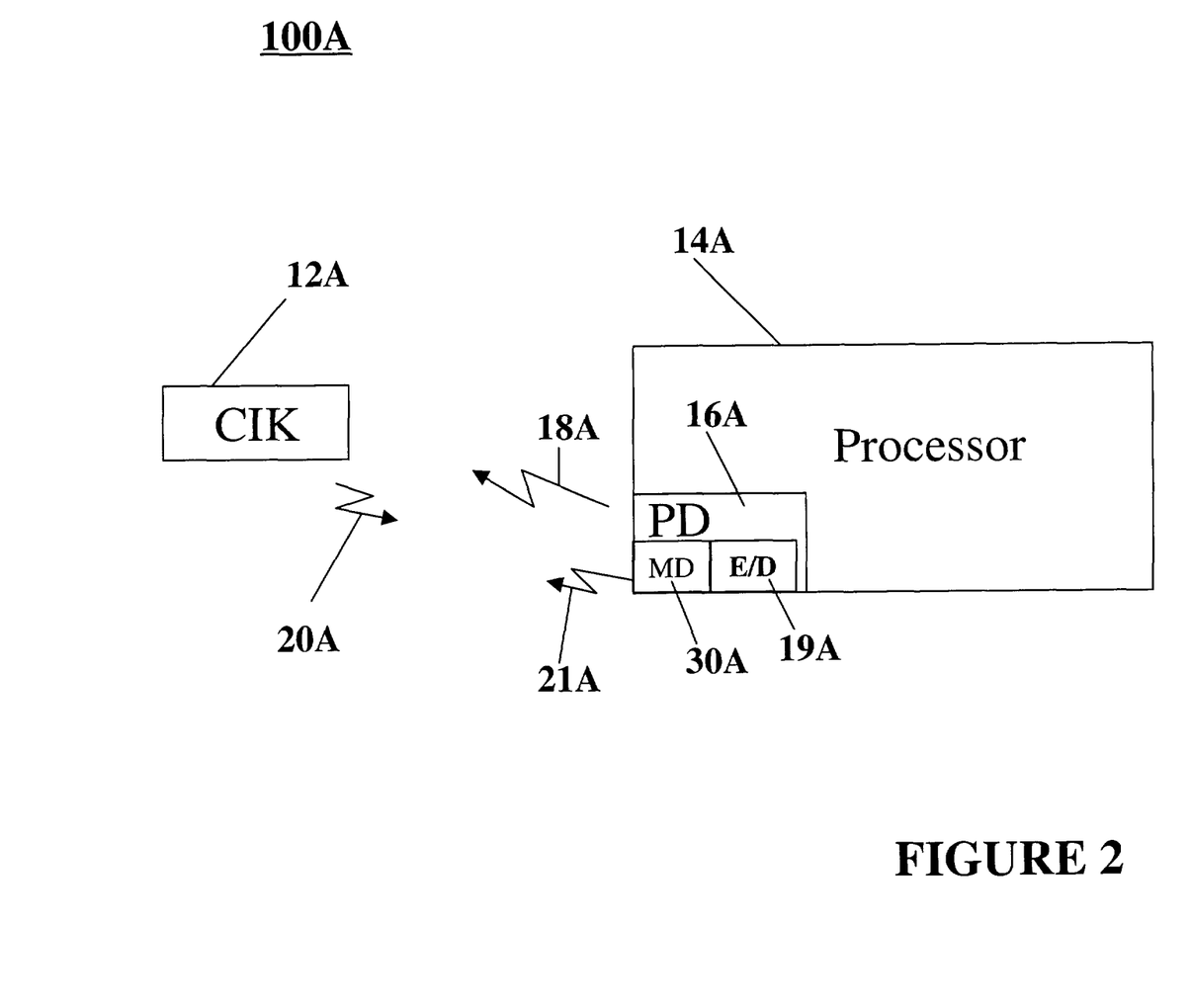
FIG. 2 is a functional block diagram of an embodiment of a system for conducting secure operations utilizing a removable CIK, wherein the processor comprises the proximity detector, in accordance with the present invention.

FIG. 2 is a functional block diagram of another embodiment of a system 100A for conducting secure operations utilizing a removable CIK 12A, wherein the processor 14A comprises the proximity detector 16A. The CIK 12A, the processor 14A, the proximity detector 16A, the manual disable portion 30A, the manual disable signal 21A, and the encryption/decryption portion 19A function similarly to the CIK 12, the processor 14, the proximity detector 16, the manual disable portion 30, manual disable signal 21, and the encryption/decryption portion 19 of the system 100, respectively, except that in the system 100A, the processor 14A comprises the proximity detector 16A, and thus the proximity signal 18A and the manual disable signal 21A are transmitted from the processor 14A to the CIK 12A, and the return signal 20A propagates from the CIK 12A to the processor 14A. As described above with respect to the system 100 of FIG. 1, the distance between the CIK 12A and the processor 14A may be determined by analyzing the time difference of the transmission of the proximity signal 18A and receipt by the proximity detector 16A of the return signal 20A, by counting a series of pulses, or a combination thereof.

Figure 3:
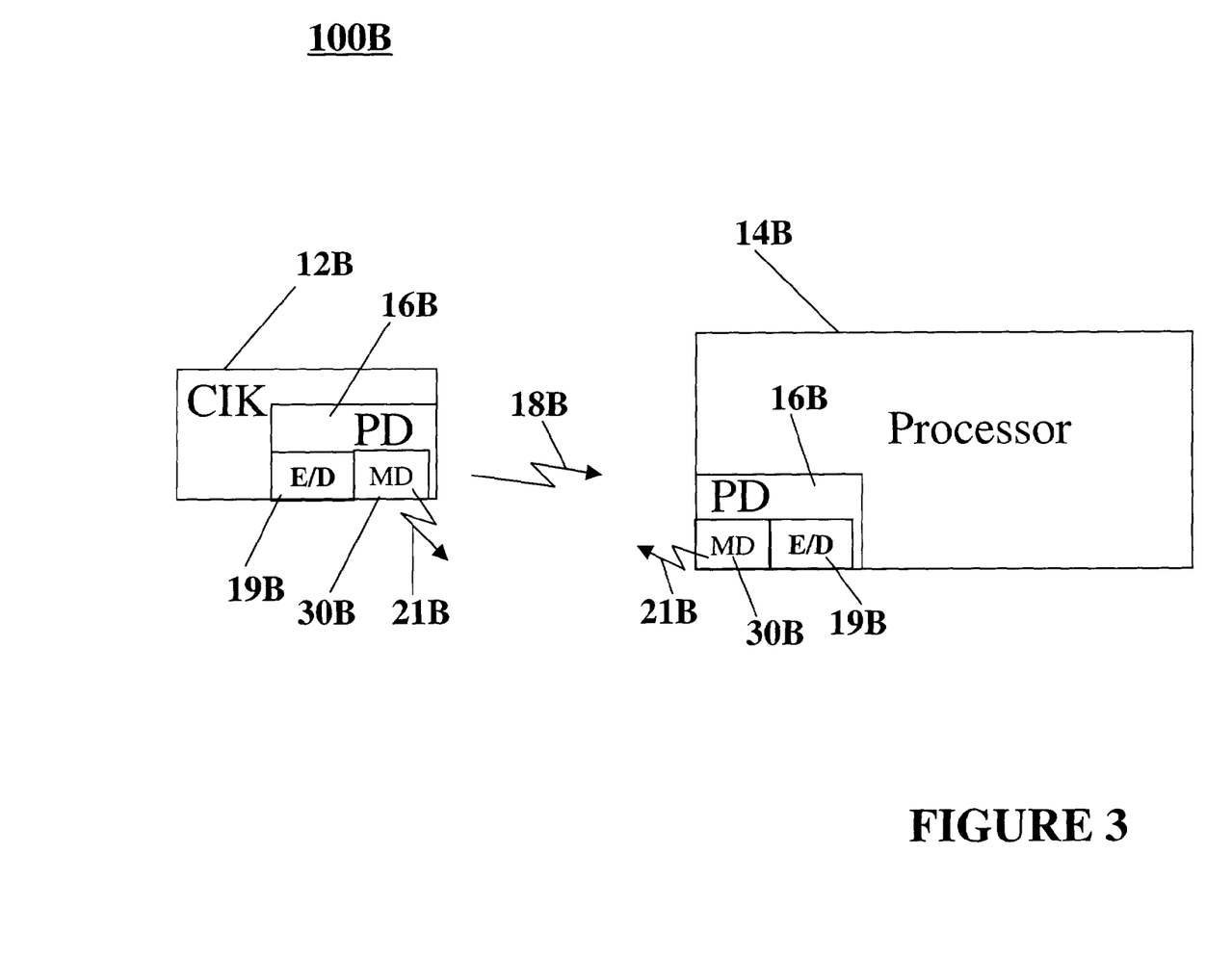
FIG. 3 is a functional block diagram of an embodiment of a system for conducting secure operations utilizing a removable CIK, wherein the CIK and processor comprise portions of the proximity detector, in accordance with the present invention.

FIG. 3 is a functional block diagram of yet another embodiment of a system 100B for conducting secure operations utilizing a removable CIK 12B, wherein the CIK 12B and processor 14B comprise portions of the proximity detector 16B. The CIK 12B, the processor 14B, the manual disable portion 30B, the manual disable signal 21B, and the encryption/decryption portion 19B function similarly to the CIK 12, the processor 14, the manual disable portion 30, the manual disable signal 21, and the encryption/decryption portion 19 of the system 100, respectively. As shown in FIG. 3, the proximity signal 18B is transmitted from the portion of the proximity detector 16B within the CIK 12B to the portion of the proximity detector 16B within the processor 14B. In this configuration, the distance between the CIK 12B and the processor 14B is determined by analyzing pulses, as described above with respect to system 100 of FIG. 1.

Figure 4:
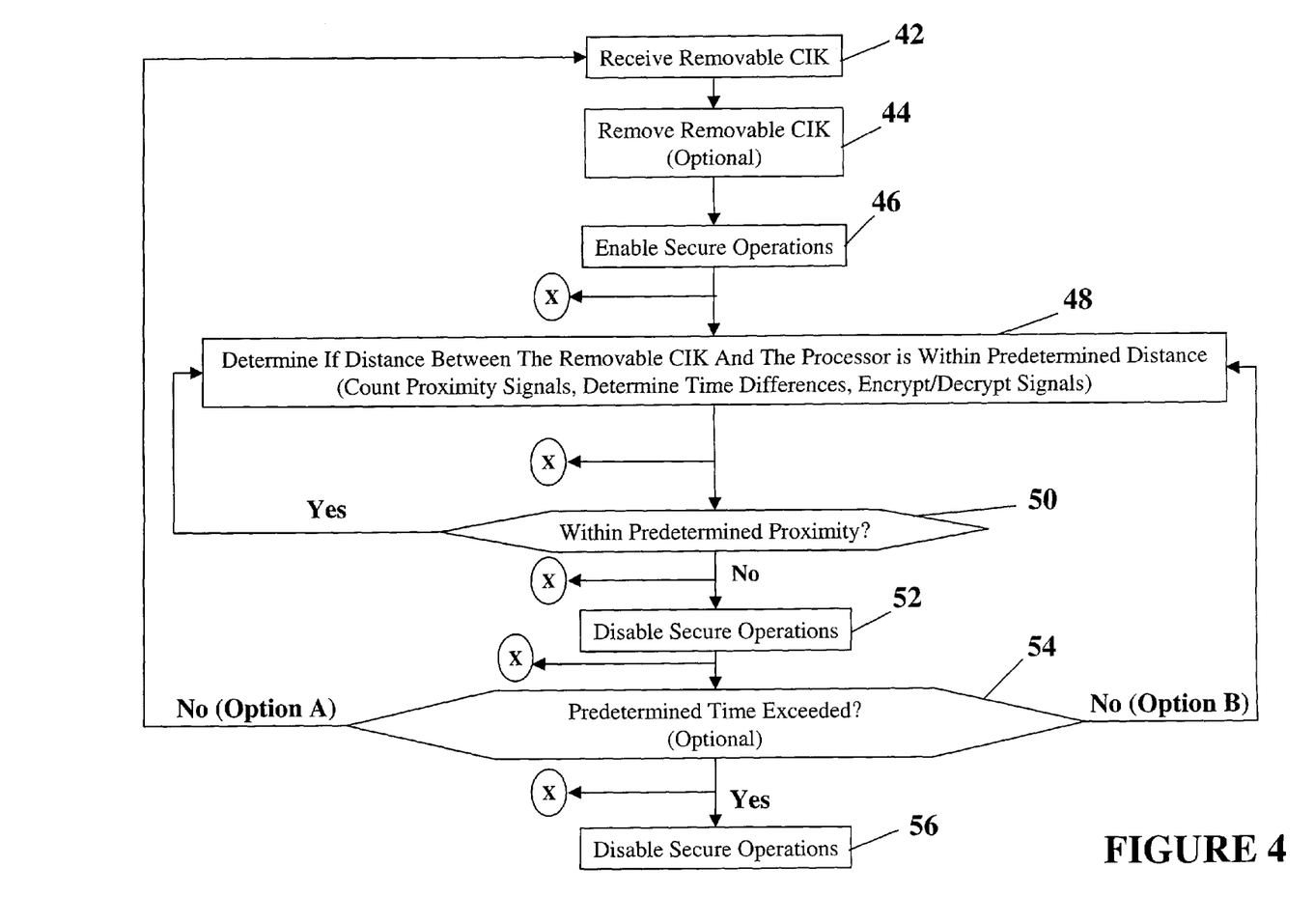
FIG. 4 is a is a flow diagram of an exemplary process for conducting secure operations utilizing a system comprising a removable CIK, a processor, and a proximity detector in accordance with the present invention.

FIG. 4 is a flow diagram of an exemplary process for conducting secure operations utilizing a system comprising a removable CIK, a processor, and a proximity detector. The CIK is received by the processor at step 42. Receiving the CIK may incorporate inserting the CIK into a slot on the processor, swiping the CIK through a card reader on the processor, placing the CIK against a magnetic reader on the processor, or a combination thereof, for example. In one embodiment, the CIK may remain inserted into the processor while conducting secure operations. In another embodiment, the CIK must be removed from the processor prior to conducting secure operations. These two embodiments are depicted at step 44.

Secure operations are enabled at step 46. Secure operations may be enabled via any appropriate means, such as encrypting and decrypting communications, encoding and decoding data, or a combination thereof, for example. It is determined if a distance between the CIK and the processor has exceeded the predetermined distance at step 48. This may be determined by analyzing signal strength, analyzing time differences, analyzing/counting proximity signal pulses, encrypting/decrypting signals, comparing the value of a determined distance with the value of the predetermining distance, or a combination thereof, as described above. At step 50, a decision is made regarding how to proceed depending upon whether the distance between the removable CIK and the processor is within the predetermined distance. If the determined distance is less than or equal to the predetermined distance, than secure operations remain enabled and the distance between the CIK and the processor is determined again (step 48). If the determined distance is greater than the predetermined distance, than secure operations are disabled at step 52.

Optionally, at step 54, a timer may be implemented (e.g., timer 30 of FIG. 1, 30A of FIG. 2, or 30B of FIG. 3) to determine if the distance between the CIK and the processor has exceed the predetermined distance for greater than a predetermined amount of time. If so two options are available, depicted as option A and option B at step 54. Under option A, secure operations may be resumed if the processor receives the CIK (step 42) within the predetermined amount of time. Under option B, secure operations may be resumed if the CIK is positioned within the predetermined distance from the processor (or the processor positioned within the predetermined distance from the CIK) within the predetermined amount of time. For example, if no proximity pulses have been received for less than or equal to the predetermined amount of time (e.g., 10 seconds), the user may reinserted the CIK into the processor to continue secure operations (option A) or may position the CIK and the processor within the predetermined distance (option B) to continue secure operations, within the predetermined amount of time (e.g., 10 seconds). However, if no proximity pulses are received for greater than the predetermined amount of time (e.g., 10 seconds), the user may not simply reinsert the CIK into the processor to continue secure operations, but will have to reinitialize the system. If the distance between the CIK and the processor exceeds the predetermined distance for longer than the predetermined amount of time, the secure operations are disabled at step 56.

Figure 5:
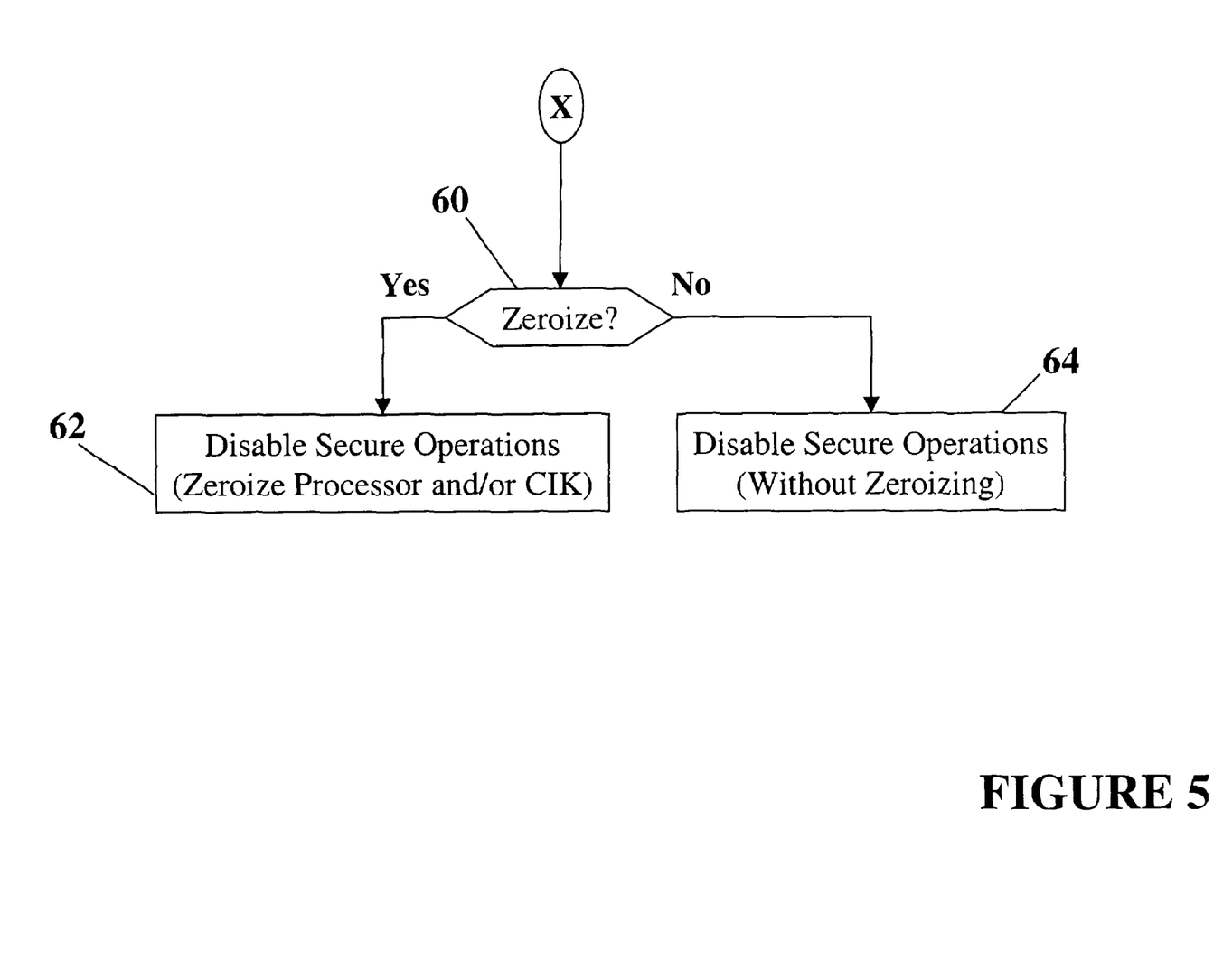
FIG. 5 is a flow diagram of an exemplary process for manually disabling secure operations in accordance with an embodiment of the present invention.

At any time during the process depicted in FIG. 4, secure operations may be disable as indicated by the step labeled "X". FIG. 5 is a flow diagram of an exemplary process for manually disabling secure operations, in accordance with an embodiment of the present invention. If the user manually disables secure operations (e.g., via manual disable portion 30), it is determined if secure operations are to be disabled without zeroizing or with zeroizing at step 60. This determination may be user selectable (e.g., via a switch) or the determination may be predetermined. If secure operations are to be disabled without zeroizing, secure operations are disabled at step 62 without zeroizing either the processor or the removable CIK. If secure operations are to be disabled by zeroizing, either the processor the removable CIK, or a combination thereof is zeroized at step 64. Zeroizing erases specific parameters stored in the processor, the removable CIK, or a combination thereof (e.g., equates predetermined parameter values in the processor to zero), thus requiring the system to be reinitialized before secure operation may commence.

The system and method comprising a removable, wireless, CIK, a processor, and a proximity detector, in accordance with the present invention, provide a user the ability to conduct secure operations when the CIK is not physically inserted into the processor. Therefore, if the processor is lost or stolen, unauthorized access to secure data within the processor is denied. This is particularly advantageous as applied to portable processors, such as military handheld radios, laptop computers, wireless phones, and PDAs. Furthermore, the signals used to determine the distance between the CIK and the processor may be encrypted (and appropriately decrypted) to provide a higher level of security.

A method for conducting secure operations utilizing a removable CIK as described herein may be embodied in the form of computer-implemented processes and system for practicing those processes. A method for conducting secure operations utilizing a removable CIK as described herein may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes a system for practicing the invention. The method for conducting secure operations utilizing a removable CIK as described herein may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes a system for practicing the invention. When implemented on a general-purpose processor, the computer program code segments configure the processor to create specific logic circuits.

Although illustrated and described herein with reference to certain specific embodiments, the removable CIK and method for implementing same as described herein is nevertheless not intended to be limited to the details shown. Rather, various modifications may be made in the details within the scope and range of equivalents of the claims and without departing from the spirit of the invention.

What is claimed is:

1. A system for conducting secure operations utilizing a removable cryptographic ignition key (CIK), said system comprising:
   said removable CIK containing an embedded password;
   a processor configured to insertably receive said removable CIK;
   a proximity detector configured to determine if a distance between said removable CIK and said processor is within a predetermined distance through wireless communication between said processor and said removable CIK, said wireless communication not indicative of the password, wherein said system is configured to:
   enable continuing secure operations subsequent to said processor receiving said removable CIK;
   conduct continuous secure operations while said removable CIK is within said predetermined distance of said processor; and
   disable continuing secure operations when a distance between said removable CIK and said processor is greater than said predetermined distance; and said system is configured to enable continuing secure operations upon said removable CIK being inserted into and subsequently removed from said processor;

a manual disable portion configured to disable continuing secure operations regardless if a distance between said removable CIK and said processor is within said predetermined distance;

wherein said manual disable portion disables continuing secure operations by at least one of interrupting and disrupting a signal conveyed by the wireless communication between said removable CIK and said processor for determining if a distance between said CIK and said processor has exceeded said predetermined distance.

2. A system in accordance with claim 1, wherein said manual disable portion disables continuing secure operations by zeroizing at least one of said removable CIK and said processor.

3. A method for conducting secure operations utilizing a removable cryptographic ignition key (CIK) with an embedded password, a processor, and a proximity detector, said method comprising:

insertably receiving said removable CIK by said processor, wherein:

continuing secure operations are enabled subsequent to receipt of said removable CIK by said processor;

receiving a wireless communication from said removable CIK by said processor, wherein the wireless communication is not indicative of the password; determining if a distance between said removable CIK and said processor is within a predetermined distance based on the wireless communication;

enabling continuing secure operations while said removable CIK is within said predetermined distance of said processor; and disabling continuing secure operations when a distance between said removable CIK and said processor is greater than said predetermined distance;

wherein continuing secure operations are enabled upon inserting said removable CIK into said processor and subsequently removing said CIK from said processor;

wherein upon receipt of a manual disable signal, disabling continuing secure operations regardless if a distance between said removable CIK and said processor is within a predetermined distance;

wherein disabling continuing secure operations upon receipt of a manual disable signal comprises at least one of interrupting and disrupting a signal conveyed by the wireless communication between said removable CIK and said processor for determining if a distance between said CIK and said processor has exceeded said predetermined distance.

* * * * *